United States Patent
Wang

(10) Patent No.: US 7,505,385 B2
(45) Date of Patent: Mar. 17, 2009

(54) METHOD OF DETECTING OPTICAL DISC ERROR INFORMATION

(75) Inventor: Chun-Cheng Wang, Taipei (TW)

(73) Assignee: Lite-On It Corporation, Taipei (TW)

( * ) Notice: Subject to any disclaimer, the term of this patent is extended or adjusted under 35 U.S.C. 154(b) by 688 days.

(21) Appl. No.: 11/108,683

(22) Filed: Apr. 19, 2005

(65) Prior Publication Data

US 2005/0262387 A1  Nov. 24, 2005

(30) Foreign Application Priority Data

May 6, 2004 (TW) .............................. 93112830 A

(51) Int. Cl.
*G11B 7/00* (2006.01)
(52) U.S. Cl. ............... 369/53.12; 369/53.13; 369/53.15
(58) Field of Classification Search ............... 369/53.12, 369/53.13
See application file for complete search history.

(56) References Cited

U.S. PATENT DOCUMENTS

| | | | |
|---|---|---|---|
| 6,243,331 B1 * | 6/2001 | Sakamoto et al. ........ 369/30.11 |
| 6,704,153 B1 * | 3/2004 | Rothberg et al. .............. 360/31 |
| 7,149,164 B2 * | 12/2006 | Tsukihashi et al. ....... 369/47.24 |
| 2002/0018405 A1 * | 2/2002 | Kumagami et al. ...... 369/30.17 |
| 2002/0152436 A1 * | 10/2002 | O'Dea ........................ 714/723 |
| 2004/0037193 A1 * | 2/2004 | Andersen et al. ......... 369/53.14 |
| 2004/0051988 A1 * | 3/2004 | Jing et al. ..................... 360/31 |

* cited by examiner

*Primary Examiner*—Wayne R Young
*Assistant Examiner*—Lixi Chow
(74) *Attorney, Agent, or Firm*—Bacon & Thomas, PLLC

(57) ABSTRACT

A method of detecting optical disc error information on an optical disc, for applying in an optical disc drive, the method comprising: first, detecting whether the optical disc is blank, if not, perform the following: checking whether a seek error occurred, if yes, recording a seek error mark; while reading a data region, recording data error information, the data error information comprises an error count, and a corresponding data error location; finally, outputting the optical disk error information according to the data error information and the seek error mark.

2 Claims, 4 Drawing Sheets

METHOD OF DETECTING OPTICAL DISC ERROR INFORMATION

This application claims the benefit of Taiwan application Serial No. 093112830, filed May 6, 2004, the subject matter of which is incorporated herein by reference.

BACKGROUND OF THE INVENTION

1. Field of the Invention

The invention relates in general to a method of detecting errors, and more particularly to a method of detecting optical disc error information of an optical disc.

2. Description of the Related Art

Optical disc recorders nowadays have become very popular, where users can easily back up their files, photos, audio and videos etc. Optical disc recorders have many varieties, such as CD-R/RW, DVD+R/RW, DVD-R/RW, DVD dual and DVD-RAM etc, and users record files onto optical discs according to the different standards associated with the optical disc recorders.

During the recording process, the optical pick-up heads of the optical disc recorders are to emit laser at the optical disk with varying powers, so that data bits 1 or 0 can be recorded on the optical discs. The problem associated with conventional applications is that when optical discs rotate at very high speeds during the recording process, the dye is not always stable or evenly distributed on the optical discs, as a result, data errors from recording inevitably occur.

With regards to CDs, the associated data errors can be classified into C1 and C2, where C1 refers to data errors that can be recovered by means of algorithms, while C2 refers to data errors that are unrecoverable. Thus, C1 data errors will not significantly affect the accuracy of the recorded data, but C2 will.

With regards to DVDs, the associated data errors are classified into PI and PO, where PI refers to data errors that can be recovered by means of algorithms, whereas PO refers to data errors that are unrecoverable. Thus, PI data errors will not significantly affect the accuracy of the recorded data, but PO will.

However, users are unable to distinguish between good and bad optical discs, or even anticipate the quality of optical discs after being recorded. That is, users can only determine the quality of the optical discs by whether the reading of the recorded optical discs was successful, and are unable to know how frequent that C1, and C2, or PI and PO occur.

SUMMARY OF THE INVENTION

It is therefore an object of the invention to provide a method of detecting optical disc error information on an optical disk.

The invention achieves the above-identified object by providing a method of detecting optical disc error information on an optical disc, for applying in an optical disc drive. The method includes: first, detecting whether the optical disc is blank, if not, performing the following steps: checking whether a seek error occurred, if yes, recording a seek error mark; while reading a data region, recording a data error information, the data error information includes an error count, and a corresponding data error location; and finally, outputting the optical disk error information according to the data error information and the seek error mark.

The invention achieves another above-identified object by providing a method of determining an optimal tilt angle for an optical pick-up head. The steps including: first, determining tilt angles, where the tilt angles are substantially different from one another; then, reading an optical disc according to the each of the tilt angles; next, generating optical disc error information for each of the tilt angles; and finally, determining the optimal tilt angle according to the optical disc error information.

Other objects, features, and advantages of the invention will become apparent from the following detailed description of the preferred but non-limiting embodiments. The following description is made with reference to the accompanying drawings.

DETAILED DESCRIPTION OF THE INVENTION

To acquire the manufacturing quality of blank optical discs, the address error information thereof is detected. Likewise, the compatibility between recorded optical discs and optical disc recorders can be obtained by detecting data error information of the recorded optical discs.

Figure 1:
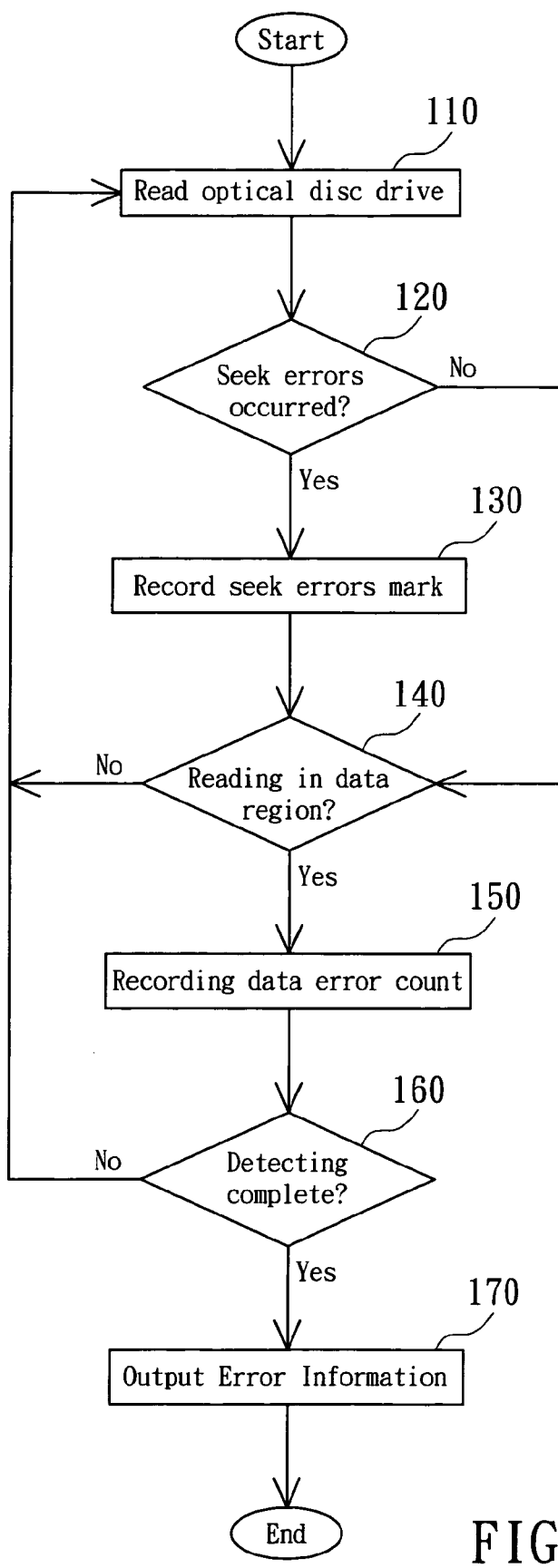
FIG. 1 is a flow diagram of a method of detecting optical disc error information according to an embodiment of the invention.

Referring to FIG. 1, a flow diagram of a method of detecting optical disc error information of a recorded optical disc according to an embodiment of the invention is shown. In this embodiment, the data being read from the optical disc, without decoding, is merely used to determine whether data errors occurred. Thus, the overall process runs very quickly.

Firstly, the optical disc is driven to rotate, and the pick-up head is arranged to move from inner tracks to outer tracks, as shown in step 110.

Then, determine if there are seek errors, as shown in step 120. If the optical disc contains regional contaminant, such as a serious scratch or a large stain left by a felt pen, then the tracks on the optical disc can not be located properly, and seek errors will result. Thus, in the event of seek errors, the region where seek errors occurred is marked as an error region, as shown in step 130.

Then, step 140 is performed to determine whether the region that the laser is focused on is a data region or not. Since there are other non-data regions on the optical disc, such as lead in/out area, gaps between audio tracks, the non-data region will be mistaken as having many data errors when the laser light is focused over these regions. Thus, data error counts are only enabled if the laser light is focused over the regions of interest, namely, the data regions, as shown in step 150. Otherwise, step 150 is skipped.

Then, step 160 is performed to determine whether the step of detecting data errors has completed. If not, then the method is returned to step 110 to repeat the steps and continue detecting the optical disk. The method according to this embodiment is not only limited to detecting data errors on the entire optical disk, but can also be applied for detecting error information on particular regions of the optical disc, such as only in detecting error information on the outer tracks of the optical disk, since the dye on the outer tracks are comparably less stable and are more likely to cause data errors.

By performing the method of detecting optical disc error information according to the embodiment, users can acquire the data error information distributed over every region of an optical disc, namely, the error information of C1 and C2 located on every region of a CD, and the error information of PI and PO located on every region of a DVD. Moreover, users can also acquire the locations of error regions. The users can thereby determine the quality of the optical disk or the optical disk drive, and the compatibility between the optical disk and the optical disk drive based on the error information.

The detecting method can also be applied in the determination of optical pick-up head tilt angles. To enable better read/write quality, the optical pick-up heads of DVD recorders are capable of making micro-adjustments. Conventionally, after the optical disc drives are manufactured, the optimal tilt angles are determined manually by personnel using instruments. However, this method of determining tilt angles does not allow much flexibility, and manufacturers bare a cost burden towards the excessive use of human resources and high instruments costs.

Figure 2A:
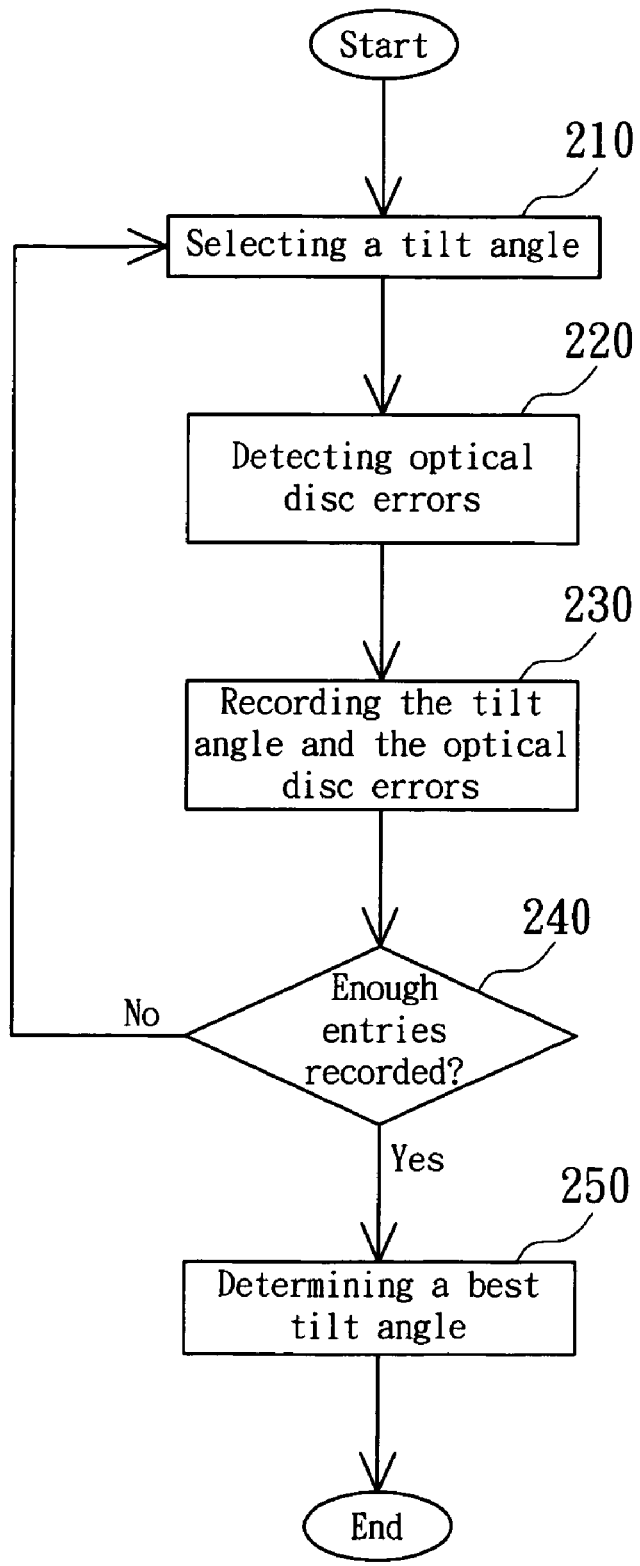
FIG. 2A is a flow diagram illustrating the application of the invention in a method of determining optical pick-up head tilt angles.

FIG. 2A is a flow diagram illustrating a method of determining optical pick-up head tilt angles by applying the method of detecting optical disc error information according to the invention. First, an initial tilt angle is set, as illustrated in step 210. Then, based on the method of detecting error information indicated by FIG. 1, the error information is detected while the pick-up head is adjusted to the tilt angle, as shown in step 220. Then, the tilt angle and the error information entries are recorded, as shown in step 230.

Next, step 240 is performed to determine if there are enough entries recorded. If not, then the method is returned to step 210. Otherwise, step 250 is performed. Whether there are enough entries is determined by the level of precision that users demand, and for example, if the entries required are equal to 10, then steps 210-230 are performed 10 times.

Figure 2B:
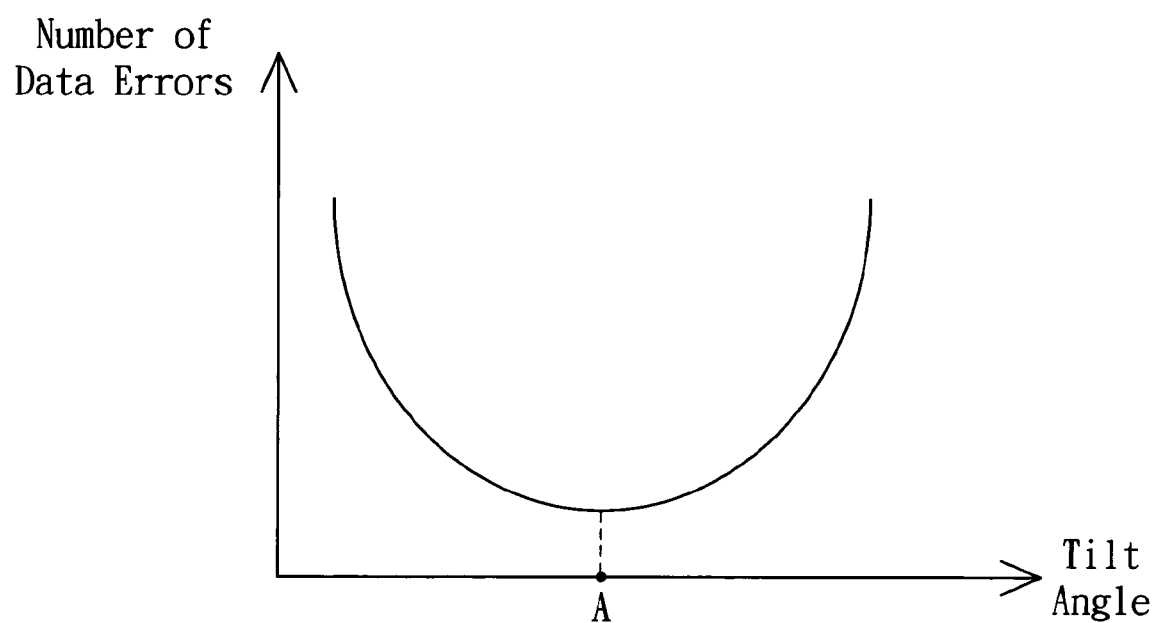
FIG. 2B shows a graph plotting the relationship between optical disc error information and tilt angles according to the data errors and tilt angles entries recorded for determining the optical pick-up head tilt angles.

Lastly, from the entries recorded, an optimal tilt angle is determined, as shown in step 250. Tilt angles are related to the error information, as shown in FIG. 2B, showing a graph plot of the recorded entries. From the figure, it can be observed that the least amount of error information is recorded while the optical pick-up head is at tilt angle A, and moving away from angle A in either direction, an increasing data errors trend is observed. Thus, from FIG. 2B, angle A is determined as the optimal tilt angle.

In addition, the method of determining tilt angles according to the invention can be applied for adjusting settings of optical disc drives, before the optical disc drives are being shipped out from the manufacturing site. By directly using the program within the firmware to determine and adjust tilt angles, thereby reducing the time required for adjusting setting, the conventional involvements of humans and instruments can be eliminated. While performing step 220 during determining tilt angles, error information detection does not have to be performed on the entire region of the optical disk, but rather, only on certain regions of the optical disk, whereby the detecting speed can be increased while maintaining precision.

The method of determining tilt angles according to the invention can also be performed while the optical disc drive is in operation. Through adjusting the tilt angles in response to the optical disc or the operation environment, a better read quality can be achieved. The tilt angle adjustments can be performed when the optical disc is inserted into the optical disc drive, or in real time during the read operation of the optical disc drive.

Figure 3:
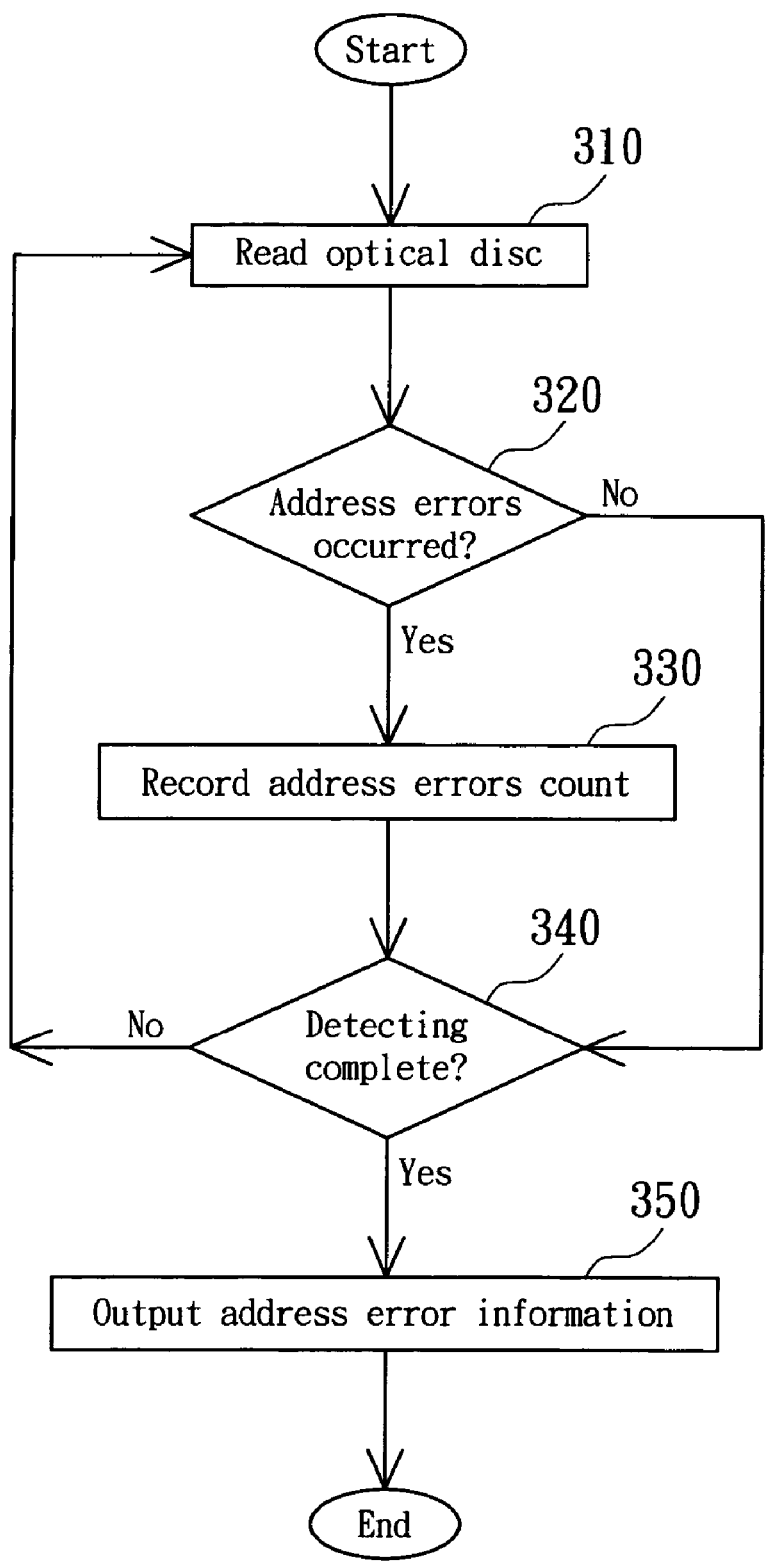
FIG. 3 shows a flow diagram of a method of detecting address error information on a blank optical disc.

FIG. 3 shows a flow diagram of a method of detecting address error information on a blank optical disc. First, step 310 is performed, driving the optical disc to rotate and the pick-up head to move from inner tracks to outer tracks to read the optical disc. Then, step 320 is performed to detect whether an address error occurred. If yes, then address error counts are added, as shown in step 330. Else, step 340 is performed to determine whether detecting is complete, such as whether detecting the entire optical disk is complete. If not, then the method is returned to step 310, else step 350 is performed to output the address error information.

The method of detecting optical disc error information according to the embodiment of the invention can be used to detect blank and non-blank optical discs, and can be applied for adjusting tilt angles of the optical pick-up heads in the optical disc drives.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of detecting optical disc error information on an optical disc, for applying in an optical drive, the method comprising:

detecting whether the optical disc is blank, if not, performing the following steps:

determining whether a seek error occurred, if yes, recording a seek error mark;

while reading a data region, recording data error information, the data error information comprises an error count, and a corresponding data error location; and outputting the optical disk error information according to the data error information and the seek error mark;

wherein, if the optical disc is detected to be blank, performing the following steps:

determining whether an address error occurred and, if yes, recording address error information, the address error information comprising an address error count and a corresponding address error location; and outputting the optical disc error information according to the address error information.

2. The method according to claim 1, wherein the outputting step further comprises plotting a graph according to the optical disc error information.

* * * * *